(12) United States Patent
Kress et al.

(10) Patent No.: US 7,881,858 B2
(45) Date of Patent: Feb. 1, 2011

(54) METHOD AND DEVICE FOR MONITORING AN EXHAUST GAS RECIRCULATION SYSTEM

(75) Inventors: Tobias Kress, Stuttgart (DE); Stefan Michael, Markgroeningen (DE); Wilhelm Blumendeller, Freiberg (DE); Horst Mueller, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/549,128

(22) Filed: Aug. 27, 2009

(65) Prior Publication Data

US 2010/0051000 A1 Mar. 4, 2010

(30) Foreign Application Priority Data

Sep. 4, 2008 (DE) ...................... 10 2008 041 804

(51) Int. Cl.
*F02M 25/07* (2006.01)
*F02B 47/08* (2006.01)

(52) U.S. Cl. .................. 701/107; 701/108; 123/568.16; 73/114.74

(58) Field of Classification Search ......... 701/107–108; 123/568.11, 568.16; 73/114.74
See application file for complete search history.

(56) References Cited

U.S. PATENT DOCUMENTS 6,257,214 B1 * 7/2001 Bidner et al. .......... 123/568.16
7,565,901 B2 * 7/2009 Furuta et al. ........... 123/568.16

* cited by examiner

*Primary Examiner*—Hai H Huynh
(74) *Attorney, Agent, or Firm*—Kenyon & Kenyon LLP (57) ABSTRACT

A method for the diagnosis of an exhaust gas recirculation system in an internal combustion engine, including providing a pressure difference reading, which gives a pressure difference in an air supply section of the internal combustion engine or a pressure difference over the exhaust gas recirculation system; determining a pressure difference reference value as a function of one or more operating variables of the internal combustion engine; and detecting a fault in the exhaust gas recirculation system as a function of the pressure difference reading and of the pressure difference reference value.

13 Claims, 7 Drawing Sheets

METHOD AND DEVICE FOR MONITORING AN EXHAUST GAS RECIRCULATION SYSTEM

CROSS REFERENCE

The present application claims the benefit under 35 U.S.C. §119 of German Patent Application No. DE 102008041804.8 filed on Sep. 4, 2008 which is expressly incorporated herein by reference in its entirety.

FIELD OF THE INVENTION

The present invention relates to a method and a device for monitoring an exhaust gas recirculation system, especially for monitoring whether sooting in an exhaust gas recirculation line or an exhaust gas recirculation valve is leading to a faulty setting of an exhaust gas recirculation rate.

BACKGROUND INFORMATION

In internal combustion engines which have an arrangement for exhaust gas recirculation, the correct setting of an exhaust gas recirculation rate (AGR rate) is a key function for achieving the legally stipulated exhaust gas emissions. The AGR rate is equivalent to the volumetric percentage proportion of the exhaust gas in the fresh air-fuel mixture. The AGR rate is regulated, in this context, in a closed control loop, using a setting of the exhaust gas recirculation valve (AGR valve) in an exhaust gas recirculation system, which is positioned between an exhaust gas section for carrying off the combustion exhaust gas and an intake manifold for supplying an air/fuel mixture to the cylinders of the internal combustion engine, and by setting a throttle valve which determines the air supply into the intake manifold. The controlled variable may be the air mass or the AGR rate, for example.

Up to now, a fault in the exhaust gas recirculation system could be detected only by monitoring the system deviation. This is sufficient for detecting a defect in the actuators, such as the AGR valve and the throttle valve.

An additional possibility of a fault is that sooting may occur in the exhaust gas recirculation system, that is, a deposit of soot and oil vapors, which are able to reduce the flow cross section through lines of the exhaust gas recirculation system, or are able to impair the functioning of the AGR valve. However, sooting cannot be detected by monitoring the system deviation since, in the case of regulation, this is compensated for by greater opening of the AGR valve or by a more pronounced initial throttling of the fresh air mass by the throttle valve.

The more pronounced initial throttling of the supplied fresh air mass influences the control of the internal combustion engine, which may lead to a deterioration in the quality of exhaust gas emissions. Particularly in the case of operating products having a high exhaust gas recirculation rate, the air mass is then no longer able to be controlled by the setting of the AGR valve, the air mass being controlled in this case by a more pronounced initial throttling of the throttle valve.

SUMMARY

It is an object of the present invention to provide a method and a device, whereby it is possible, during the operation of the internal combustion engine, to detect a diminution of the cross sectional area of the exhaust gas recirculation line, the exhaust gas recirculation cooler, or an impairment of an AGR valve.

This object may be attained by an example method and device for monitoring an exhaust gas recirculation system in accordance with the present invention.

According to a first aspect, an example method for diagnosing an exhaust gas recirculation system in an internal combustion engine is provided. The example method includes the following steps:
carrying out a regulation for adjusting an exhaust gas recirculation rate by setting a throttle valve;
providing a pressure difference reading, which gives the pressure difference in an air supply section of the internal combustion engine or the pressure difference over the exhaust gas recirculation system;
determining a pressure difference reference value as a function of one or more operating variables of the internal combustion engine;
detecting a fault in the exhaust gas recirculation system as a function of the pressure difference reading and the pressure difference reference value.

In particular, the pressure difference reading may correspond to
a reading of the setting of the throttle valve in the air supply section of the internal combustion engine, or
a reading of a pressure difference between the pressure before the throttle valve and the pressure after the throttle valve, especially of a pressure difference or a pressure ratio; or
a reading of the pressure difference between the pressure in an exhaust gas section of the internal combustion engine and an air supply section of the internal combustion engine, especially of a pressure difference or a pressure ratio.

One aspect of the above method is to determine, via a pressure ratio within the air supply section or between the air supply section and the exhaust gas section of an internal combustion engine, or via a setting of the throttle valve, whether sooting is present in the exhaust gas recirculation system. This takes place by reference to the pressure difference reference value, that is specified for the operating point determined by the operating variables. If one determines a deviation of the pressure difference reading at the operating point, with the aid of the pressure difference reference value, sooting might be present.

In the case of operating points having a high exhaust gas recirculation rate, that is, at operating points at which the AGR valve is open, and at an active air mass regulation or AGR rate regulation, the position of the throttle valve is observed, for instance. The exhaust gas mass flow that is supplied into the intake manifold is reduced by the sooting. Therefore, at completely opened AGR valve, in order to reach the setpoint air mass or the setpoint AGR rate in the case of sooting, the throttle valve is initially throttled more strongly by the regulation than in the case of an exhaust gas recirculation system that is working normally.

Furthermore, a release fulfillment time is able to be ascertained as the overall time of the presence of release states in one or more operating states, as a function of one or more operating variables, the release state stating when the internal combustion engine is in a static operating state.

In addition, it may be provided that the release state is only present if an exhaust gas recirculation valve in the exhaust gas recirculation system is opened by more than a valve position threshold value.

In particular, it may be provided that a fault is detected only if the release fulfillment time exceeds a release time threshold value.

According to one specific embodiment, these additional steps may be provided:
comparing the pressure difference reading to the pressure difference reference value; and
ascertaining a fault time as a function of the result of the comparison and as a function of the presence of the release state, the fault time stating the overall time during which the pressure difference reading deviates from the pressure difference reference value and while the release state is present;

detecting a fault as a function of the release fulfillment time and of the fault time.

In particular, in the case of dynamic operating states of the internal combustion engine, since an increased deviation may occur between the pressure difference reading and the pressure difference reference value, the robustness of the method should be enhanced. For a vehicle that is intact (without there being any sooting), as the pressure difference reference value, a boundary value of the setting of the throttle valve may be ascertained which is exceeded only very rarely or never. However, in response to the sooting of the AGR line, this boundary value is exceeded more frequently. When the release conditions are fulfilled, the above method checks repeatedly whether the pressure difference reading exceeds the pressure difference reference value. If the ratio of the time, during which, in response to the fulfilled release conditions, the pressure difference reading exceeds the pressure difference reference value, to the time during which the release conditions are fulfilled, exceeds a fault ratio threshold value, one may conclude that there has been a fault in the exhaust gas recirculation system.

A fault may particularly be detected if the ratio of the fault time and the release fulfillment time exceeds a fault ratio threshold value.

According to one additional specific embodiment, the pressure difference reference value may be ascertained as a function of one or more operating variables of the internal combustion engine and with the aid of a reference value function, especially with the aid of a characteristics curve, a characteristics map and/or with the aid of a lookup table. In the case of a completely intact exhaust gas recirculation system, the reference value function may be determined by recording the pressure difference reading at a plurality of operating points determined by one or several operating variables.

According to a further aspect, an example device for diagnosing an exhaust gas recirculation system in an internal combustion engine is provided. The example device includes:

an engine control unit for carrying out a regulation for setting an exhaust gas recirculation rate by setting a throttle valve;

a checking unit for receiving a pressure difference reading, which gives the pressure difference in an air supply system of the internal combustion engine or the pressure difference over the exhaust gas recirculation system;

a reference value unit for determining a pressure difference reference value as a function of one or more operating variables of the internal combustion engine;

a device for detecting a fault in the exhaust gas recirculation system as a function of the pressure difference reading and the pressure difference reference value.

According to another aspect, an engine system is provided having an internal combustion engine that has an air supply section, having an exhaust gas system, having an exhaust gas recirculation system and having the above device.

According to a still further aspect, a computer program is provided, which includes a program code that implements the above method when it is run on a data processing unit.

BRIEF DESCRIPTION OF THE DRAWINGS

Preferred specific embodiments of the present invention are explained in greater detail below, on the basis of the figures.

DETAILED DESCRIPTION OF EXAMPLE EMBODIMENTS

Figure 1:
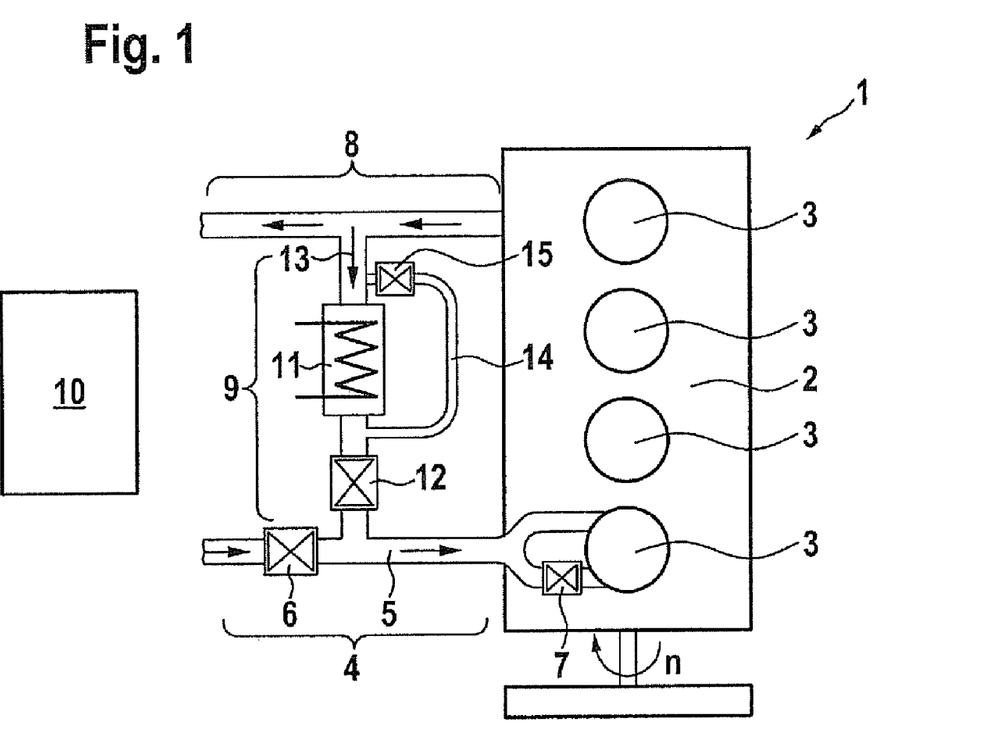
FIG. 1 shows a schematic block diagram of an internal combustion engine having an exhaust gas recirculation system.

FIG. 1 shows a schematic representation of an internal combustion engine 1 having an engine block 2 in which cylinders 3 are situated. Air is supplied to internal combustion engine 1 via an air supply section 4, which has an intake manifold 5 and a throttle valve 6 upstream of intake manifold 5. Throttle valve 6 is used to adjust the fresh air supply to intake manifold 5. For this purpose, throttle valve 6 is controlled or regulated by an engine control unit 10. To do this, engine control unit 10 may provide an air mass regulation which sets the air quantity so as to provide a setpoint torque.

The air in intake manifold 5 is mixed with fuel. The air/fuel mixture thus created is let into respective cylinders 3 via a respective intake valve 7, controlled by a camshaft (not shown) or by engine control unit 10.

The combustion exhaust gas from cylinders 3 is carried off via an exhaust gas section 8. Between exhaust gas section 8 and intake manifold 5, an exhaust gas recirculation system 9 is provided, which has an exhaust gas recirculation cooler (AGR cooler) 11, an exhaust gas recirculation valve (AGR valve) 12, the valves being positioned in series on an exhaust gas recirculation line (AGR line) 13. Furthermore, an AGR cooler 11 may have a bypass line 15 in which a bypass valve 15 is situated, in order to short-circuit AGR cooler 11 at certain operating conditions. The AGR rate is determined among other things by the setting of AGR valve 12 by engine control unit 10.

In exhaust gas recirculation system 9, contaminations by soot and oil residues, which are contained in the exhaust gas derived from exhaust gas section 8, may deposit, and thus lead to sooting, that is, adsorption of solids in areas of exhaust gas recirculation system 9, which may lead to a reduction in the effective cross section of AGR line 13, or to an impairment of the operativeness of AGR valve 12. In both cases, less exhaust gas is guided into intake manifold 5 than is specified by the setting of AGR valve 12. In the case of an activated exhaust gas recirculation regulation, which may be implemented in engine control unit 10, when there is a reduced quantity of recirculated exhaust gas, throttle valve 6 may be closed further than would be the case for the set operating point, in order to regulate the AGR rate in intake manifold 5 to the desired value. All in all, the air charge of cylinders 3 is influenced, which is able to lead a deterioration in exhaust gas emissions.

Figure 2:
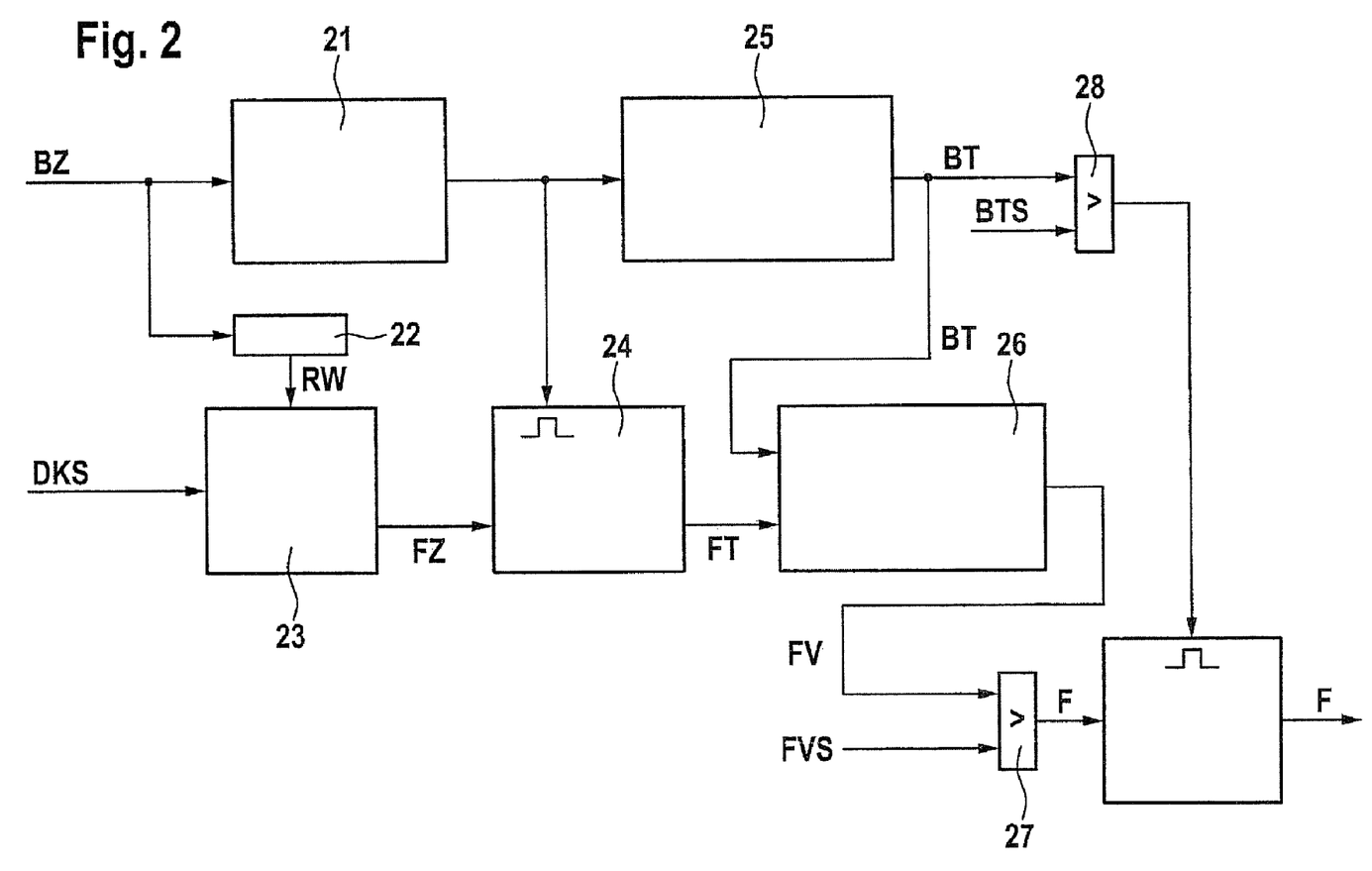
FIG. 2 shows a schematic representation of the function for detecting sooting in the exhaust gas recirculation system of the internal combustion engine of FIG. 1.
Figure 3:
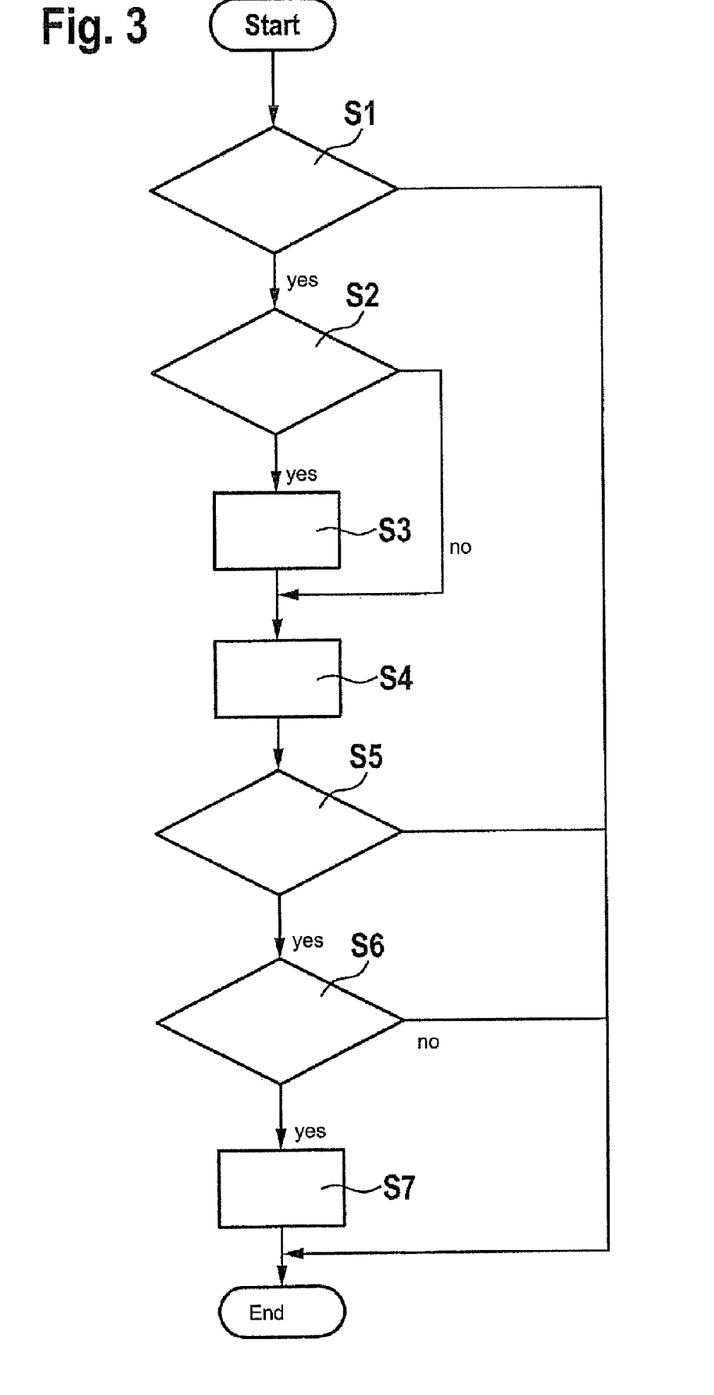
FIG. 3 shows a flow chart to illustrate the function for detecting sooting in the exhaust gas recirculation system.

For this reason, a function is implemented for detecting sooting in exhaust gas recirculation system 9 or generally for detecting the impairment of the passing through of exhaust gas by exhaust gas recirculation system 9, preferably in engine control unit 10. FIG. 2 shows a functional block diagram showing the functioning of a sooting detection. FIG. 3 shows the associated flow chart, which corresponds to an alternative representation of the function shown in FIG. 2.

In a step S1, it is first checked whether the current operating state of internal combustion engine 1 is suitable for determining a sooting condition. For this, one or more release conditions have to be fulfilled, which correspond to an operating state in which the quantity of the exhaust gas, guided through exhaust gas recirculation system 9, exceeds a certain value. The presence of the release condition is determined, for instance, with the aid of all or a subtotal of operating variables rotational speed, load, AGR rate to be set and fuel injection quantity. For a part, or for all of these operating variables, threshold values may be defined which have to be exceeded for the release of the diagnostic process. The function of checking whether the release conditions are fulfilled is implemented in FIG. 2 by release block 21. In release block 21, the corresponding operating variables rotary speed, load, AGR rate and fuel injection quantity are supplied in the form of operating variables BZ, and it is determined with the aid of a characteristics map or a predefined release function whether a diagnosis is to be carried out.

If the release conditions have been fulfilled (alternative: yes), in step S2, the controlled variable for setting throttle valve 6 (throttle valve controlled variable DKS) is set into relationship with a reference value RW, and it is checked whether throttle valve controlled variable DKS is greater than reference value RW. For this purpose, for various operating variables BZ, a corresponding function is stored, for instance, in the form of a characteristics map, a lookup table or the like, which assigns reference value RW to the operating state determined by the abovementioned operating variables. This assignment takes place in a reference value unit 22. Reference value RW is supplied to a checking unit 23. Checking unit 23 compares the setting of throttle valve 6 to a reference value RW and detects a fault when there is a deviation, which is output in the form of a fault condition FZ.

If it is determined, in checking block 23, that there is a deviation between throttle valve controlled variable DKS and specified reference value RW (alternative: yes), then in a first counter block 24, the times are added (step S3), in which both a fault condition has been detected and the release conditions are fulfilled. In a second counter block 25 the times are ascertained in which only the release condition is fulfilled (step S4). A periodic time signal is supplied in each case to counter blocks 24, 25, which leads to the incrementing of a corresponding counter value if the respective conditions are fulfilled.

In a calculation block 26, the ratio is formed of the counter value output by first counter block 24, which corresponds to a fault time FT, to the counter value output by second counter block 25, which corresponds to a release fulfillment time BT, and a fault ratio FV is passed on to a first comparison block 27.

In order to increase the robustness, a fault based on a detected deviation of throttle valve controlled variable DKS from reference value RW is recognized as a fault, and consequently sooting is detected, only if release fulfillment time BT states that the time period, during which the release conditions were fulfilled, is sufficiently great. This is determined in a second comparison block 28, in which release fulfillment time BT is compared (step S5) to release time threshold value BTS, which may be predefined in a fixed manner.

If it is determined in step S5 that release fulfillment time BT is greater than release time threshold value BTS (alternative: yes), then, in first comparison block 27, fault ratio FV is compared to a specified fault ratio threshold value FVS, and the possible presence of sooting is determined if fault ratio FV is greater than fault ratio threshold value FVS (step S6). If it is determined in step S6 that release ratio FV is greater than fault ratio threshold value FVS (alternative: yes), then a fault signal F is output at the output of first comparison block 27.

Only if release fulfillment time BT is greater than release time threshold value BTS is fault signal F supplied as a statement concerning the sooting of the exhaust gas recirculation system 9.

A corresponding fault may be output or stored in step S7 if fault signal F indicates this.

The checking of the presence of release conditions and the multiple checking of the deviation between throttle valve controlled variable DKS and the associated reference value RW increases the robustness of the method, since, particularly during the dynamic operation of internal combustion engine 1, operating states are able to occur in which throttle valve controlled variable DKS deviates from the reference value, without sooting actually being present.

Figure 4A:
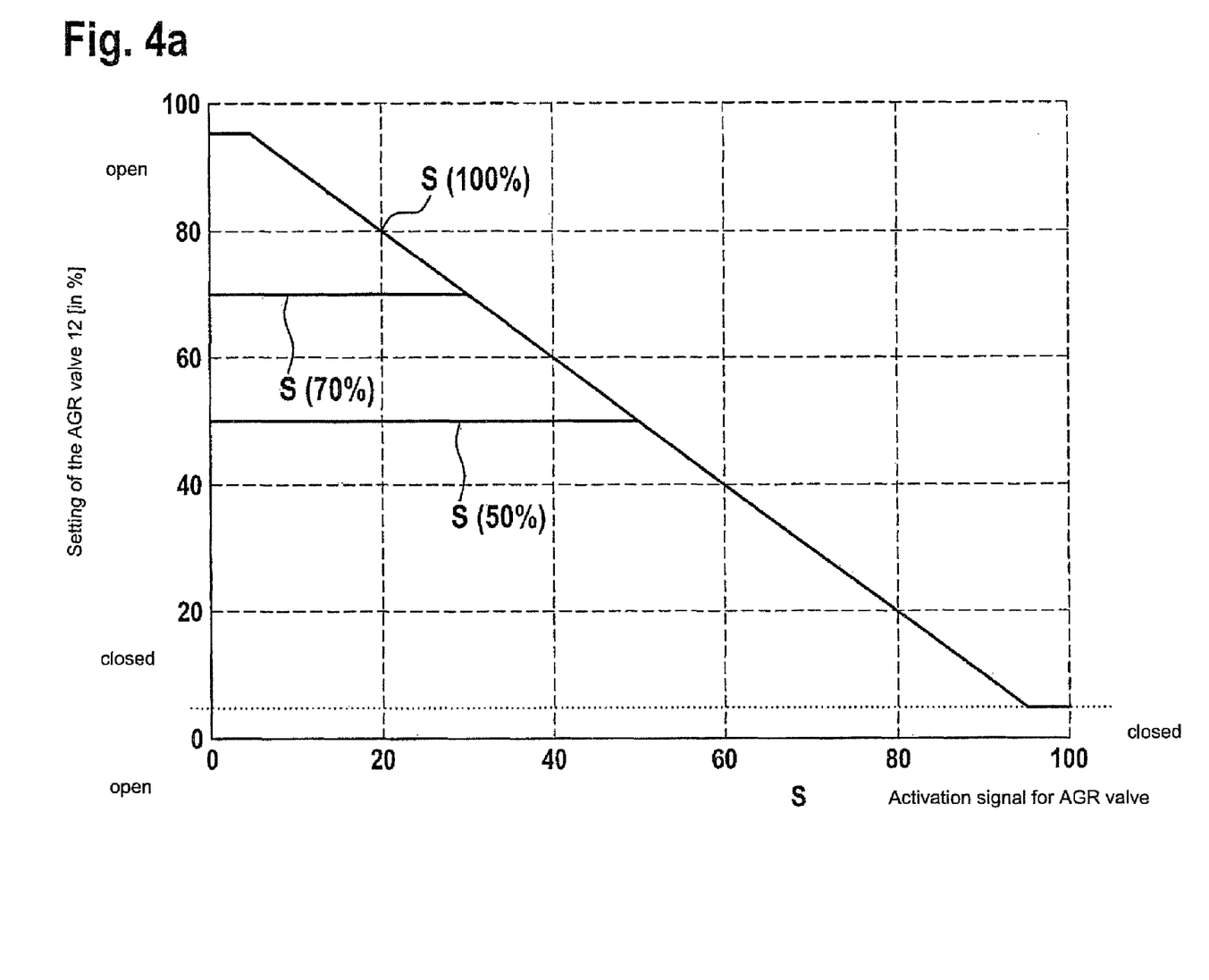
FIGS. 4a and 4b show a representation of the functioning of sooting detection in response to limiting the opening of the AGR valve to 50% and 70% compared to an AGR valve that is in working order, as well as a representation of the resulting fault rates.

FIG. 4a shows the plot of a control signal S for AGR valve 12, which specifies the setting of AGR valve 12 against the actual opening setting (S(100%)) of exhaust gas recirculation valve 12 in a fully functional state, as well as in cases in which the exhaust gas recirculation valve is able to be opened only as far as 50% (S(50%)) or as far as 70% (S(70%)) of the fully open setting. This may occur in response to sooting of AGR valve 12, that is, an impairment of the orderly function of AGR valve 12.

Figure 4B:
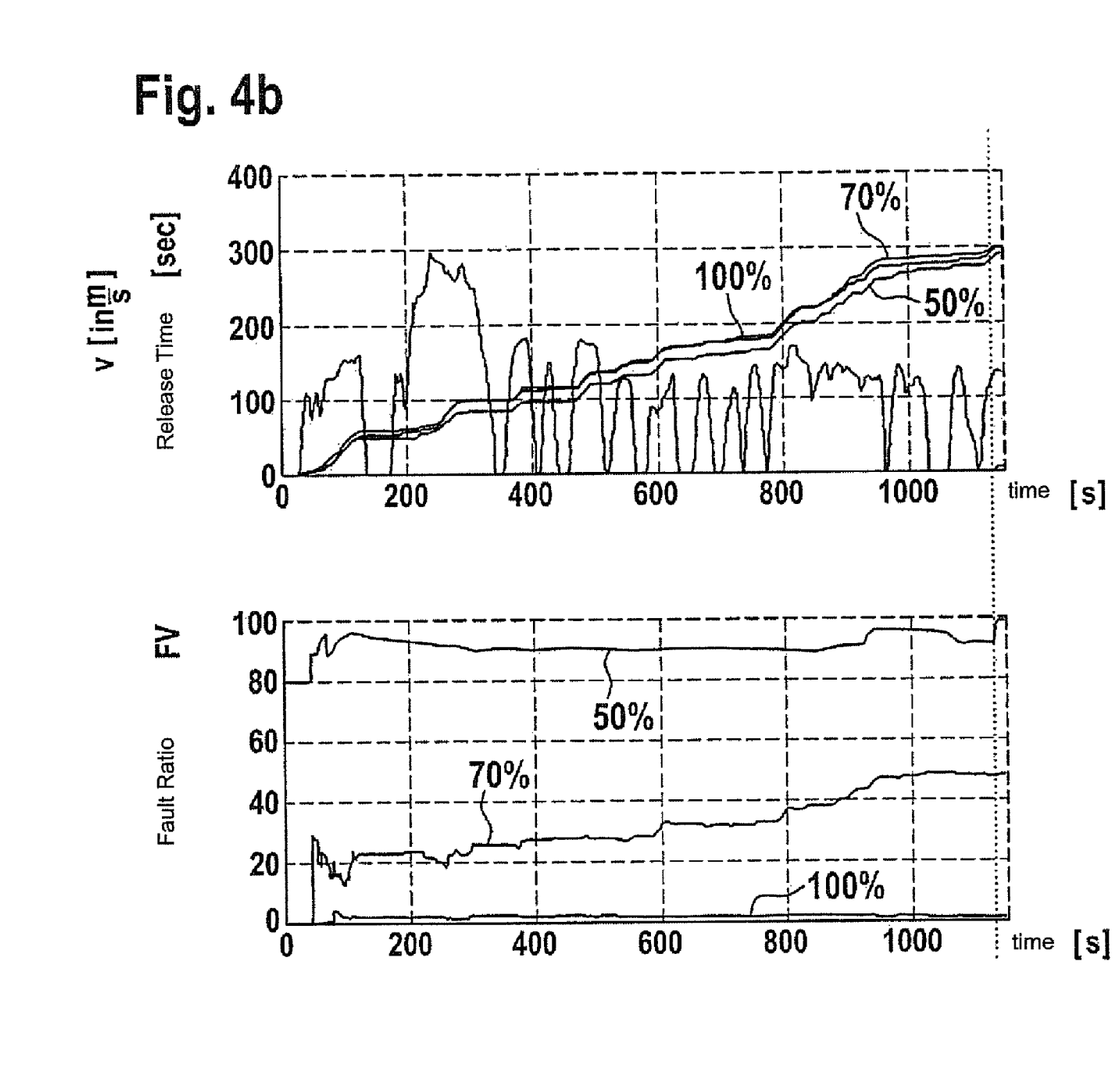

In the diagrams of FIG. 4b, a normal driving cycle of a vehicle is shown with the aid of the speed curve v (FIG. 4b, top). The lower diagram of FIG. 4b shows the plot of fault ratio FV against time. It is seen that, in response to an orderly functioning of AGR valve 12, the fault ratio is a few percent, whereas, during a limitation to 70% of the open setting, this slowly rises from 25% to ca. 50%. However, the fault ratio assumes a value of ca. 95% already after 300 seconds if the open setting of the exhaust gas recirculation valve is limited to 50%.

In addition, in the upper diagram of FIG. 4b, the curves are plotted of release fulfillment time BT output by second counter block 25. It will be seen that, with respect to the release conditions, the respective counter value always changes when the speed of the vehicle changes only slowly or not at all. This shows that the influences of dynamic behavior of internal combustion engine 1 on the diagnosis are reduced to the greatest extent.

Figure 5A:
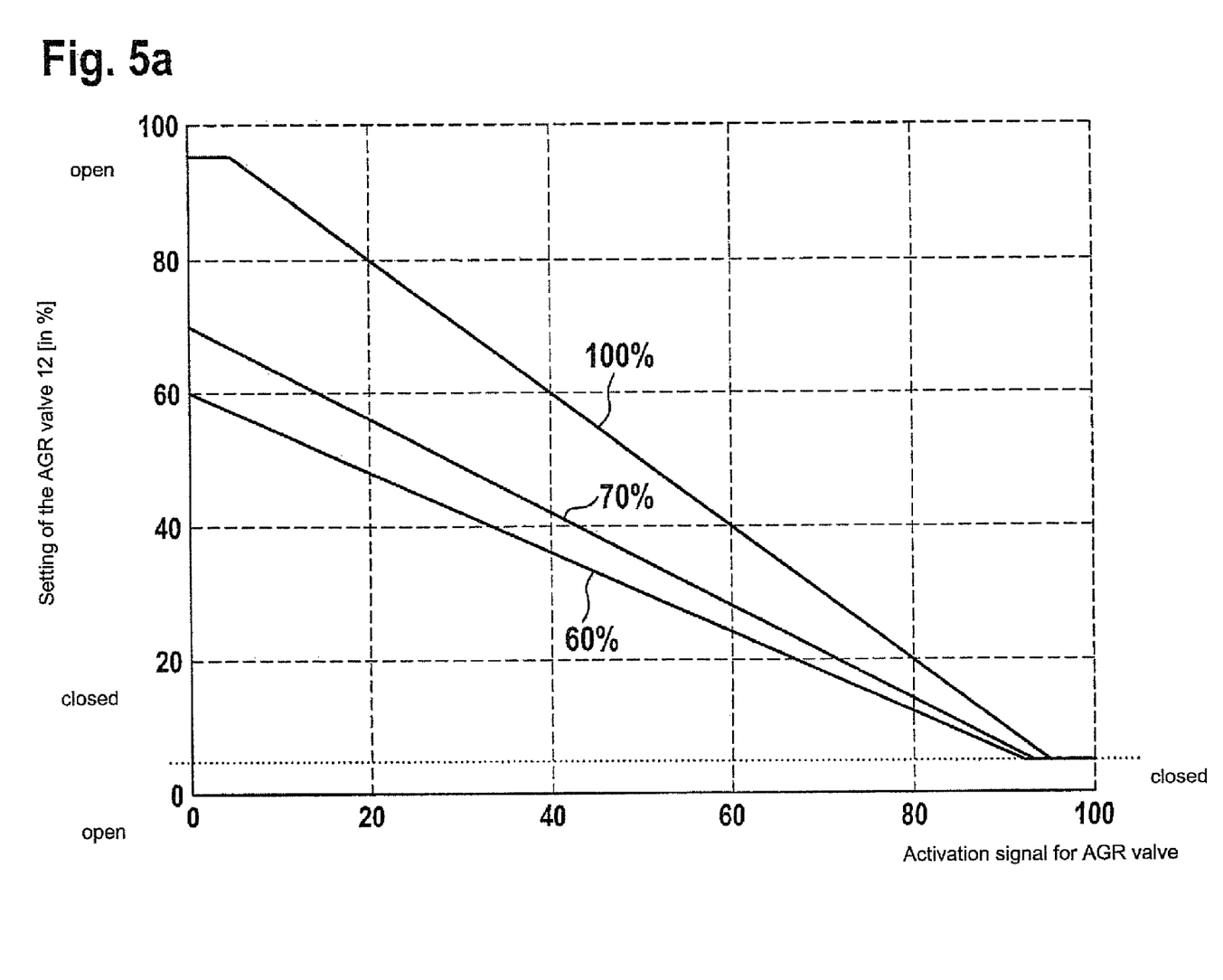
FIGS. 5a and 5b show representations of the functioning of sooting detection in response to a reduced sensitivity of the AGR valve to 60% and 70% compared to an AGR valve that is in working order, as well as a representation of the resulting fault rates.

FIG. 5a shows the curves of the setting of AGR valve 12 plotted against control signal S of AGR valve 12, the sensitivity with respect to the fully functional exhaust gas recirculation system and a sooted exhaust gas recirculation system is reduced to 70% or 60% of the value of the fully functioning exhaust gas recirculation system. Using such a functioning method of AGR valve 12, cases may be simulated in which sooting in exhaust gas recirculation line 13 occurs along with the result of a cross sectional narrowing of exhaust gas recirculation line 13. Therefore, even in response to a fully opened AGR valve 12, an exhaust gas flow into the intake manifold is only able to be achieved which corresponds to an opening of the AGR valve of 60 or 70% of a mass flow of the recirculated exhaust gas at a fully functional exhaust gas recirculation system.

Figure 5B:
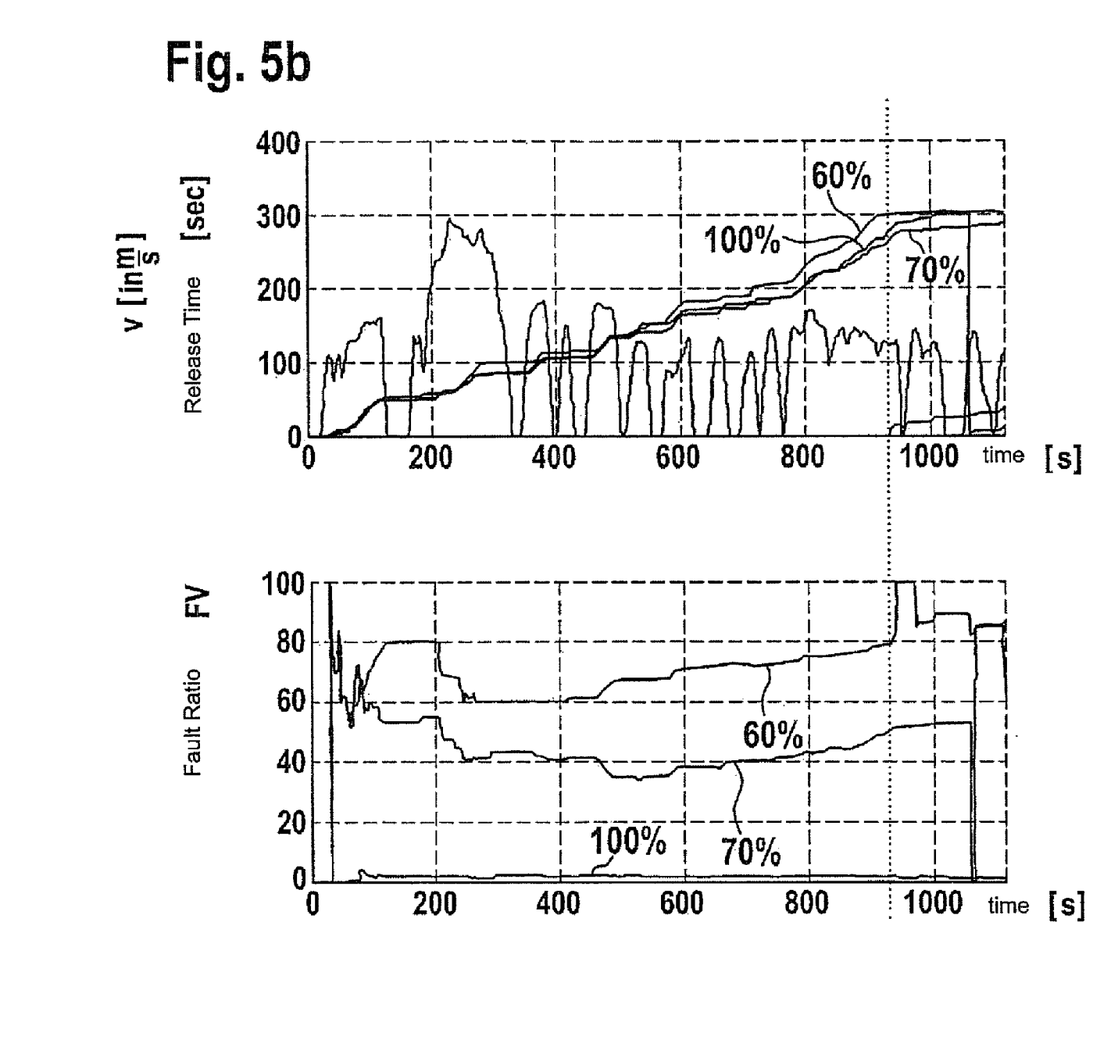

FIG. 5b shows a driving behavior by the curve of the speed v plotted against time in the upper diagram of FIG. 5b. In the lower diagram of FIG. 5b it will be seen that only a fault ratio FV of a few percent is determined if no functional impairment of the exhaust gas recirculation system is present. In response to an effective change in the sensitivity when AGR valve 12 is activated, as is the case, for example, in response to sooting of AGR line 13, in the case of a sensitivity reduction of 30% to a total of 70%, one obtains a fault ratio of ca. 50% after a release time FT of 300 s, and in the case of a sensitivity reduction to 60%, one obtains a fault ratio FV of 80% after a release time FT of 300 s. Now, in order to detect a fault, a fault ratio threshold value FVS may be established, for instance, depending on the desired sensitivity, such as a value of 40%, in order to detect sensitivity reductions to 60% or 70%, and in order further to detect a functioning impairment of an AGR valve 12, in which the open position is able to be approached only up to 50% or 70%.

What is claimed is:

1. A method for the diagnosis of an exhaust gas recirculation system of an internal combustion engine, comprising:
   carrying out a regulation for adjusting an exhaust gas recirculation rate by setting a throttle valve;
   providing a pressure difference reading, which gives one of i) a pressure difference in an air supply section of the internal combustion engine or ii) a pressure difference over the exhaust gas recirculation system;
   determining a pressure difference reference value as a function of at least one operating variable of the internal combustion engine; and
   detecting a fault in the exhaust gas recirculation system as a function of the pressure difference reading and of the pressure difference reference value.

2. The method as recited in claim 1, wherein the pressure difference reading corresponds to one of: i) a reading of the setting of the throttle valve in the air supply section of the internal combustion engine, ii) a reading of a pressure difference between pressure before the throttle valve and pressure after the throttle valve, or iii) a reading of the pressure difference between pressure in an exhaust gas section of the internal combustion engine and an air supply section of the internal combustion engine.

3. The method as recited in claim 1, further comprising:
   detecting a release fulfillment time as an overall time of a presence of release states in at least one operating state, as a function of at least one operating variable, the release state stating when the internal combustion engine is in a static operating state.

4. The method as recited in claim 3, wherein a release state is present only when an exhaust gas recirculation valve in the exhaust gas recirculation system is opened by more than a valve setting threshold value.

5. The method as recited in claim 3, wherein a fault is detected only if the release fulfillment time exceeds a release time threshold value.

6. The method as recited in claim 3, further comprising:
   comparing the pressure difference reading to the pressure difference reference value;
   ascertaining a fault time as a function of a result of the comparison and as a function of a presence of the release state, the fault time stating an overall time during which the pressure difference reading deviates from the pressure difference reference value and while the release state is present; and
   detecting a fault as a function of the release fulfillment time and of the fault time.

7. The method as recited in claim 6, wherein a fault may be detected if a ratio of the fault time and the release fulfillment time exceeds a fault ratio threshold value.

8. The method as recited in claim 1, wherein the pressure difference reference value is ascertained as a function of one or more operating variables of the internal combustion engine and with the aid of a reference value function.

9. The method as recited in claim 8, wherein the reference value function, in the case of a fully intact exhaust gas recirculation system, is determined by recording the pressure difference reading at a plurality of operating points determined by at least one operating variable.

10. The method as recited in claim 1, wherein the pressure difference reference value is ascertained as a function of one or more operating variables of the internal combustion engine and with the aid of at least one of a characteristics curve, a characteristics map, and a lookup table.

11. A device for the diagnosis of an exhaust gas recirculation system in an internal combustion engine, comprising:
    an engine control unit adapted to carry out a regulation for adjusting an exhaust gas recirculation rate by setting a throttle valve;
    a checking unit to receive a pressure difference reading, which gives one of a pressure difference in an air supply system of the internal combustion engine or a pressure difference over the exhaust gas recirculation system;
    a reference value unit to determine a pressure difference reference value as a function of at least one operating variable of the internal combustion engine; and
    a device adapted to detect a fault of the exhaust gas recirculation system as a function of the pressure difference reading and the pressure difference reference value.

12. An engine system of an internal combustion engine, comprising:
    an air supply section;
    an exhaust gas section;
    an exhaust gas recirculation system; and
    a device for diagnosis of the exhaust gas recirculation system, the device including an engine control unit adapted to carry out a regulation for adjusting an exhaust gas recirculation rate by setting a throttle valve, a checking unit to receive a pressure difference reading which gives one of a pressure difference in the air supply section or a pressure difference over the exhaust gas recirculation system, a reference value unit to determine a pressure difference value as a function of at least one operating variable of the internal combustion engine, and a device adapted to detect a fault of the exhaust gas recirculation system as a function of the pressure difference reading and to pressure differences reference value.

13. A memory device storing a computer program, the computer program when executed by a processor, causing the processor to perform the steps of:
    carrying out a regulation for adjusting an exhaust gas recirculation rate by setting a throttle valve;
    providing a pressure difference reading, which gives one of i) a pressure difference in an air supply section of an internal combustion engine or ii) a pressure difference over an exhaust gas recirculation system;
    determining a pressure difference reference value as a function of at least one operating variable of the internal combustion engine; and
    detecting a fault in the exhaust gas recirculation system as a function of the pressure difference reading and of the pressure difference reference value.

* * * * *